No. 802,902. PATENTED OCT. 24, 1905.
W. ALEXANDER & L. POSNANSKY.
ELASTIC TIRE.
APPLICATION FILED MAR. 14, 1905.
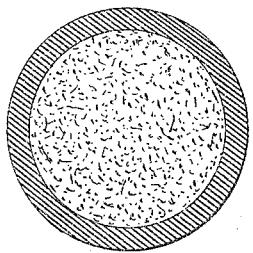

UNITED STATES PATENT OFFICE.

WALTER ALEXANDER, OF CHARLOTTENBURG, AND LEON POSNANSKY, OF BERLIN, GERMANY.

ELASTIC TIRE.

No. 802,902.     Specification of Letters Patent.     Patented Oct. 24, 1905.

Application filed March 14, 1905. Serial No. 250,120.

*To all whom it may concern:*

Be it known that we, WALTER ALEXANDER, chemist, a subject of the King of Prussia, German Emperor, residing at No. 3 Knesebeckstrasse, Charlottenburg, near Berlin, and LEON POSNANSKY, chemist, a subject of the Emperor of Austria-Hungary, residing at No. 19 Klopstockstrasse, Berlin, in the Kingdom of Prussia, German Empire, have invented an Elastic Tire for Carriages, of which the following is a specification.

Each of the two main types of elastic tires for carriages, solid rubber and pneumatic, has its particular and important disadvantages. The first named is too heavy and not sufficiently elastic, the latter too easily hurt. It has consequently been tried in a number of patents to remedy this fault among other contrivances by filling hollow tires with more or less elastic material—as, for instance, with cork, felt, and similar stuff—or to make the solid rubber porous inside. Not one of these materials has proved practically successful, because by permanent pressure they all lose elasticity and flatten by strong pressure.

In the accompanying drawing is represented a cross-section of a tire.

Now we have found that ground and pressed factis proves to be a most excellent material for filling tires, keeping permanently elastic. Factis (artificial rubber, india-rubber substitute) is a product of oil and sulfur or chlorid of sulfur and comes either in loose flakes or in solid pieces and is generally used only in connection with natural rubber for the manufacture of india-rubber articles. This material factis ground and pressed has the peculiarity to gain in elasticity, a result not observed in any other material heretofore used for filling tires. It is therefore necessary to produce a useful tire to strongly press the ground factis in order to prevent a decrease of its volume, which might be brought about by the weight and pressure of the carriage in motion. Thus a permanently-elastic tire is obtained. For this purpose it is advisable to use the factis in the shape of a fine powder, which is produced by grinding the flakes or the solid clumps.

Tires can be manufactured in the three following manners: First, fill a hose consisting of a woven fabric gummed for protection against moisture and wear and tear by friction or a good rubber hose having a woven fabric inside with ground factis, pack so closely that the factis is pressed into its smallest volume, and then join the two ends any way you choose—for instance, by a muff—so that a tire is formed; second, in a proper mold form a tire of ground factis and cover it with india-rubber, leather, or other material; third, slide the tire already filled with ground factis over the wheel and then press it by a bipartite felly. Now it would take quite extraordinary injuries to cause even small portions of the elastic inside of such tires to eke out, and such injuries could easily be remedied.

As the coat or covering of the factis inside need not at all be air-tight, leather or fabric therefore, as mentioned before, can be used in the place of rubber. Another advantage of one method is that the tiresome and tedious inflation of the pneumatic tire is done away with. Finally, the cost of a tire filled with factis is considerably less in price than a solid rubber tire on account of the cheaper material and also cheaper than a pneumatic tire on account of its simpler method of production.

What we claim as our invention, and desire to secure by Letters Patent, is—

An elastic tire consisting of ground factis more or less closely pressed and inclosed in a hose or hose-like covering of india-rubber, leather, woven fabric or similar material.

In testimony whereof we have signed our names to this specification in the presence of two subscribing witnesses.

WALTER ALEXANDER.
     LEON POSNANSKY.

Witnesses:
  HENRY HASPER,
  WOLDEMAR HAUPT.